United States Patent [19]

Castagna et al.

[11] 3,940,379

[45] Feb. 24, 1976

[54] PROCESS FOR CONTROLLED DEGRADATION OF PROPYLENE POLYMERS

[75] Inventors: Eugene G. Castagna, Clark; Albert Schrage, East Orange; Michael F. Repiscak, West Orange, all of N.J.

[73] Assignee: Dart Industries, Inc., Los Angeles, Calif.

[22] Filed: May 21, 1973

[21] Appl. No.: 362,134

[52] U.S. Cl....... 260/88.2 S; 260/93.7; 260/94.9 GC
[51] Int. Cl.................... C08f 27/22; C08f 27/28
[58] Field of Search...... 260/94.9 GC, 94.9 G, 93.7, 260/88.2 S

[56] References Cited
UNITED STATES PATENTS

| | | | |
|---|---|---|---|
| 2,828,296 | 3/1958 | Guillet | 260/94.9 GC |
| 3,144,436 | 8/1964 | Greene et al | 260/94.9 GC |
| 3,563,972 | 2/1971 | Kowalski | 260/94.9 GC |

*Primary Examiner*—William F. Hamrock
*Attorney, Agent, or Firm*—Arthur S. Collins; Bryant W. Brennan; Fred S. Valles

[57] ABSTRACT

A process is provided for the degradation of propylene polymers comprising contacting a propylene polymer exhibiting a first melt flow rate with oxygen or an oxygen-containing gas and an organic or inorganic peroxide; melting and working the resulting mixture in a high shear zone thereby degrading said propylene polymer; and recovering an essentially odor free propylene polymer exhibiting a second melt flow rate higher than said first melt flow rate.

12 Claims, No Drawings

PROCESS FOR CONTROLLED DEGRADATION OF PROPYLENE POLYMERS

This invention relates to an improved process for the production of propylene polymers. More particularly, this invention relates to an improved process for the controlled oxidative degradation of propylene polymers.

Propylene polymers, especially polypropylene, have become increasingly popular as their suitability for a wide variety of end use applications is realized. These end uses, however, require propylene polymers of different molecular weights and/or molecular weight distributions to achieve the variety of processing requirements which are encountered. Molecular weight and molecular weight distribution are difficult parameters to control in conventional propylene polymerizations, especially when employing Ziegler-type catalysis. Control of such parameters during polymerization requires use of chain terminators or transfer agents and the results obtained are strongly dependent upon the polymerization conditions. Attempts have heretofore been made to overcome these problems by blending resins of different molecular weights and/or molecular weight distributions. The difficulties associated with blending, however, have been reproducibility of blend composition and non-uniform molecular weight distributions.

It has been found more expedient to degrade propylene polymers to the desired molecular weight range rather than impose undue restrictions on the polymerization reaction. Typically, the polymer is subjected to an extrusion operation wherein thermal degradation is effected. It has been difficult, however, to achieve control over the ultimate molecular weight or molecular weight distribution in this manner. Further attempts have been made to controllably degrade propylene polymers by admixing air or another oxygen-containing gas with the propylene resin during the extrusion operation. Rather complex techniques have been developed to monitor and regulate extruder back pressure, screw speed, temperature and oxygen addition rate to attain control over the resultant molecular weight and molecular weight distribution. In addition, these techniques require the use of high melt temperatures in order to obtain the higher melt flow rates required for many applications. The high melt temperatures often impart undesirable discoloration to the resultant product. Still further, if an oxygen source such as a peroxide is employed, the peroxide concentration required to effect sufficient degradation gives rise to odor problems in the final product and creates an undesirable environment surrounding the processing line which is offensive to line workers.

Accordingly, it is an object of the present invention to provide an improved process for the controlled degradation of propylene polymers which overcomes the deficiencies of the prior art.

It is another object of the present invention to provide an improved process for the degradation of propylene polymers which enables the obtainment of higher melt flow rates than could otherwise be achieved with air or other oxygen-containing gases.

It is still another object of the present invention to impart higher melt flow rates to propylene polymers at lower melt temperatures thereby improving the color of the final product.

It is a further object of the present invention to provide an easily controllable process for the oxidative degradation of propylene polymers to provide resin of a desired molecular weight with a very narrow molecular weight distribution.

It is a still further object of the present invention to provide a degraded propylene resin exhibiting no objectionable odor.

These as well as other objects are accomplished by the present invention which provides a process for the oxidative degradation of propylene polymers which comprises:

contacting propylene polymers exhibting a first melt flow rate with less than about 1 percent by weight of oxygen and from about 0.01 to 0.1 percent by weight of an inorganic or organic peroxide; melting and working the resulting mixture in a high shear zone thereby degrading said propylene polymers; and recovering an essentially odor free propylene polymer exhibiting a second melt flow rate higher than said first melt flow rate.

It has been found in accordance with the present invention that propylene polymers can be controllably degraded by extruding the propylene polymers in the combined presence of oxygen and an organic or inorganic peroxide.

As used herein, the term "propylene polymer" is intended to include homopolymeric polypropylene and copolymers of propylene with other copolymerizable monomers wherein the major portion, i.e., greater than about 50% by weight of the copolymer is comprised of propylene moieties. Suitable copolymerizable monomers include, for example, ethylene, butylene, 4-methylpentene-1 and the like.

In accordance with the process of the present invention a polypropylene resin and an inorganic or organic peroxide are charged to a blending zone. A blanket of an inert gas such as nitrogen, argon and the like is maintained within the blending zone be feeding the inert gas to said zone. The peroxide is uniformly blended with the polypropylene resin by means of an agitator, paddle, blade or the like within the blending zone. Although it is not considered strictly necessary to maintain the blending zone under an inert blanket, use of an inert gas is considered preferably for safety reasons. If desired, the blending of the polypropylene and peroxide can be effected upon admixture of the components during the extrusion operation.

Any inorganic or organic peroxide can be employed in the process of the present invention. Illustrative of the peroxides which can be suitably employed are hydrogen peroxide, dicumyl peroxide, t-butyl peroxy isopropyl carbonate, di-tertbutyl peroxide, p-chlorobenzoyl peroxide, dibenzoyl diperoxide, t-butyl cumyl peroxide, t-butyl hydroxyethyl peroxide, di-t-amyl peroxide, 2,5-dimethylhexene-2,5-diperisononanoate and the like. The peroxide can be blended with the propylene resin in amounts varying from about 0.01 to 0.1 percent by weight of propylene resin. At these levels, residual peroxide odor is not considered objectionable. Preferably, the peroxide concentration ranges from 0.015 to 0.05 percent by weight of resin. Most preferable, high boiling, low odor peroxides such as t-butyl peroxy isopropyl carbonate are used. At peroxide concentrations below about 0.01%, no significant difference in melt flow rate, as compared to the use of air alone, is effected. At peroxide concentrations above 0.1%, excessive oxidative degradation can occur resulting in a polypropylene resin of extremely low viscosity which severely hampers the extrusion process.

The resulting peroxide/polypropylene blend can then be charged to the hopper of a high shear zone such as provided by an extruder. A condition of high shear is maintained within the extruder by heating the resin blend to a molten state with heating means associated with the extruder and working the melt in the annular zone between the extruder screw and the inner wall of the barrel of the extruder, as the melt passes through the extruder to the forming means or die which terminates the extruder.

Conventionally, propylene polymer extrusion is conducted in an inert atmosphere because of the susceptibility of the tertiary carbon to either thermal or oxidative cleavage. In the present invention, however, oxygen or an oxygen-containing gas, which most conveniently and economically can be air, is charged to the extruder together with the peroxide/polypropylene blend. To avoid excessive oxidative degradation and to reduce safety hazards, it is considered preferable to maintain the oxygen level within the extruder at less than about 1 percent by weight of resin. Most preferably, the oxygen level is maintained between about 0.5 to 0.95 percent by weight of resin. Typically, for an 8 inch diameter NRM commercial extruder, for example, air flow rates ranging from about 2 to 15 ft.$^3$/min. have been found suitable.

The extruder is operated so that the melt temperature of the resin within the barrel averages between about 300° to about 650°F., and preferably between about 300° and 530°F. Generally, propylene polymers exhibit a softening temperature in the range of about 300°–350°F. Under the operating conditions of the present invention, a melt temperature above about 530°F can result in polymers of such low viscosity that it becomes extremely difficult to maintain sufficient back pressure to keep the extruder in operation. The upper temperature limits can vary, however, depending upon the duration and extent of exposure to high shear rates. Thus, in commercial extruders, e.g., an 8 inch diameter NRM extruder, 530°F. is an effective upper limit; however, as the size of the extruder decreases, higher melt temperatures up to and including 650°F. can be suitably employed.

Although not wishing to be bound by any theory or mechanism, it is currently believed to be desirable to maximize oxidative degradation while minimizing thermal degradation since it is believed that thermal degradation induces discoloration in the resin product through formation of double bonds, especially conjugated double bonds, in the polymer. The combined effect of oxygen and peroxide in accordance with the present invention enables significant differences in melt flow rates to be achieved at lower temperatures than were heretofore necessary to achieve such results since the combination of oxygen and peroxide apparently reduces the thermal requirements necessary to obtain degradation. Use of these lower temperatures reduces thermal degradation thereby substantially eliminating excessive discoloration of the resin product. It is also currently believed that the use of oxygen, alone, maximizes thermal degradation imparting discoloration to the product; whereas, the use of oxygen and peroxide in accordance with the present invention imparts significantly less color to the polymer than the use of oxygen alone due to the reduced thermal requirements to effect degradation and due to the different mechanisms involved in peroxide oxidation verses oxidation with oxygen alone. The use of a peroxide alone creates odor problems both during extrusion and upon storage of the ultimate product. Products obtained in accordance with the present invention exhibit a highly deisrable bright water-white color. Upon egress of the degraded polypropylene from the extruder, it can be cooled and further processed in conventional manner. For example, the extrudate can be passed through a water bath and then pellitized. Alternatively, through use of a suitable extrusion coating die head, the resin can be extrusion coated directly onto a suitable substrate. The resulting coated product does not exhibit a noticeable peroxide odor.

The degraded polypropylene products of the present invention exhibit excellent extrudability and end use properties, expecially fiber properties. Moreover, the products exhibit an extremely narrow molecular weight distribution, nil peroxide odor and superior brightness and water whiteness. Melt flow rates can be raised in accordance with the present invention to at least about twice the initial melt flow rate of the feedstock.

The following example further illustrates the present invention. Unless otherwise stated, all percentages and parts are by weight.

A polypropylene homopolymer resin having an initial melt flow rate (determined in accordance with ASTM D 12381) of 20 is stabilized with 0.10% Irganox 1010 (a tetrakis [methylene-3(3′,5′-di-tert.-butyl-4′-hydroxy phenyl) propionate] methane available from Ciba-Geigy Corporation), 0.10% distearylthiodipropionate and 0.15% calcium stearate and blended with 0.04% tert.-butyl peroxy isopropyl carbonate in a nitrogen atmosphere. The resulting blend is charged to the sealed hopper of an 8″ NRM extruder. Air is charged to the hopper at the rate of 3.5 ft$^3$/min. The extruder is operated to maintain a melt temperature of 500°F. The polypropylene/peroxide/air mixture is extruded through 400 mesh screenpacks to a die head adapted to form strands of polypropylene. The strands of polypropylene are cooled upon passage through a water bath and fed to a pelletizer. The pellets obtained in this manner are bright, odor-free, water-white pellets exhibiting a melt flow rate of 40.

Although specific materials and conditons were set forth in the above example for controllably degrading polypropylene in accordance with the present invention, these are merely intended as illustrations of the present invention. Various other propylene polymers, peroxides, oxygen-containing gases, polymer stabilizers, additives and the like can similarly be employed with similar results.

Other modifications of the present invention will occur to those skilled in the art upon a reading of the present disclosure. These are intended to be included within the scope of this invention.

What is claimed is:

1. A process for the controlled oxidative degradation and minimized thermal degradation of propylene polymers, comprising: contacting a propylene polymer exhibiting a first melt flow rate, with gaseous oxygen and with an organic or inorganic peroxide; melting and working said mixture of polymer, oxygen and peroxide in a high shear zone at a temperature and for a time sufficiently low to minimize thermal degradation while subjecting said propylene polymer to substantial oxidative degradation, said polymer being selected from the group consisting of polypropylene and copolymers of propylene and α-olefins of 2 to 6 carbon atoms; and recovering an essentially odor free propylene polymer exhibiting a second melt flow rate higher than said first melt flow rate.

2. Process as defined in claim 1 wherein less than about 1% by weight of oxygen from either oxygen or an oxygen-containing gas is employed.

3. Process as defined in claim 1 wherein from about 0.01 to about 0.1 percent by weight of an organic or inorganic peroxide is employed.

4. Process as defined in claim 3 wherein from about 0.015 to 0.05 percent by weight of an organic or inorganic peroxide is employed.

5. Process as defined in claim 3, wherein from about 0.5 to 0.95 percent by weight of oxygen is employed.

6. Process as defined in claim 1 wherein the resulting mixture is melted and worked at a melt temperature varying from about 300°F. to about 650°F.

7. Process as defined in claim 6 wherein the melt temperature ranges from about 300°F. to about 530°F.

8. Process as defined in claim 1 wherein the propylene polymer and the peroxide are pre-blended before introduction into said high shear zone.

9. Process as defined in claim 8 wherein the propylene polymer and peroxide are pre-blended in the presence of an inert gas.

10. Process as defined in claim 9 wherein the propylene polymer/peroxide blend is charged to the high shear zone and contacted therein with oxygen.

11. Process as defined in claim 10 wherein the oxygen is derived from air introduced to said high shear zone.

12. Process as defined in claim 1 wherein the second melt flow rate of the propylene polymer upon egress from the high shear zone is at least about twice the first melt flow rate of the propylene polymer charged to the high shear zone.

* * * * *